United States Patent Office 3,457,073
Patented July 22, 1969

3,457,073
PHOTOCHEMICAL CROSS-LINKING OF POLYMERS
Gerard Albert Delzenne, Wilrijk-Antwerp, Belgium, assignor to Gevaert-Agfa, N.V., Mortsel, Belgium, a Belgian company
No Drawing. Filed Aug. 22, 1966, Ser. No. 573,843
Claims priority, application Great Britain, Oct. 11, 1965, 43,135/65
Int. Cl. G03c 5/00, 1/68
U.S. Cl. 96—35.1                    8 Claims The present invention relates to a process for photochemically cross-linking polymers, to the production of printing plates and etching resists and to printing plates and etching resists obtained by this process.

It is known to sensitise layers of albumin, gelatin and other colloids by the incorporation of ammonium dichromate. Upon photographically exposing these layers, the exposed areas become insoluble whereas the nonexposed areas remain soluble and can be washed away. The fact that layers sensitised with dichromate must be sensitised just prior to the exposure because the sensitised surface does not keep very well, constitutes a great difficulty. The problem is to find a process that employs a sensitive layer, which is manufactured and thereafter can be stored for a considerable time until exposure and subsequent processing.

It is an object of the present invention to provide a new class of polymers or polymeric compositions that can be cross-linked photochemically. Another object is to provide improved photographic layers containing these new polymers. Yet another object is to provide improved photographic resist materials and printing plates for lithography and other related processes. Further objects will become apparent from the following description and examples.

The polymers or polymeric compositions of the invention comprise a polymer containing groups that are reactive with intermediates deriving from the photochemical decomposition of thiadiazole groups, and thiadiazole groups present either in said polymer or in separate compounds containing at least two of the said thiadiazole groups.

According to the invention a curable composition is provided which is capable of forming a cross-linked structure on exposure to light, said composition comprising (A) a polymeric material carrying groups that are reactive with intermediates deriving from the photochemical decomposition of thiadiazole groups and (B) a compound containing more than one thiadiazole group.

The polymeric material (A) carries groups that are reactive with intermediates deriving from the photochemical decomposition of thiadiazole groups. Among these reactive groups, groups comprising active hydrogen atoms such as hydroxyl groups, amino groups and thiol groups, or further aliphatic or aromatic double bonds, etc. are of special interest. These reactive groups may be substituted directly on the main polymeric chain as well as on side chains.

The polymeric material carrying the reactive groups may be a natural polymer, a chemically modified natural polymer, a synthetic polymerisation, polycondensation or polyaddition product.

Among the natural polymers carrying hydroxyl groups may be mentioned cellulose, starch, dextrin and the like, and their partial esters and ethers as long as they still possess in their structure a substantial amount of free hydroxyl groups capable of reacting with intermediates deriving from the photochemical decomposition of thiadiazole groups. Examples of such modified natural polymers are hydroxyethyl and hydroxypropyl derivatives of cellulose and starch.

Synthetic polymerisation products that can be cross-linked according to the proccess of the invention are butyl rubber, poly(vinyl alcohol), partly acetalised or esterified poly(vinyl alcohol), and copoymers comprising in their polymeric structure a substantial amount of styrene or vinyl alcohol. If the synthetic polymerisation product is a copolymer, the comonomer or comonomers may be chosen among styrene and its nuclear substituted derivatives, vinyl chloride, vinylidene chloride, vinyl esters, vinyl ethers, acrylic and methacrylic acid esters, acrylonitrile, methacrylonitrile, butadiene, and the like. These comonomers are worked up into the synthetic polymerisation product in order to provide to the copolymers a maximum of strength and hardness after exposure to light and cross-linking.

In the same way a certain amount of plurally unsaturated monomeric groups may be incorporated into the copolymer, such as divinylbenzene, diglycol diacrylates, N,N′-alkylene-bis-acrylamides and -methacrylamides, N-allyl- and N-methallyl acrylamides, N,N-diallylacrylamide, ethylene diacrylate and triallyl cyanurate, provided that the photosensitive layer remains soluble if not affected by actinic light.

Synthetic condensation polymers carrying free hydroxyl groups are for instance polyamides carrying hydroxymethyl or hydroxyethyl substituents, and epoxy resins such as the polyether obtained by the polycondensation of 2,2-bis(4-hydroxyphenyl)-propane with epichlorohydrin.

Natural and synthetic polymeric materials comprising thiol or amino groups are useful also, e.g. thiolated gelatin, poly(thiolstyrene), poly(vinyl mercaptan), the condensation product of poly(isophthalylidene-hexamethylene diamine) and thioglycolic acid as described in Example 5 of the Belgian patent specification 622,556, gelatin, poly(vinyl amine), poly(amino styrene) and polyamides or polyesters bearing free amino groups along the polymeric chain.

To the above enumerated polymeric materials minor amounts of compounds containing more than one thiadiazole group may be added as photochemical cross-linking agents according to the invention.

Under the influence of light the thiadiazole groups are probably decomposed into thiacarbene groups, which immediately will react with the reactive groups of the polymeric material present and cross-link the latter to the insoluble state. The partial rearrangement to a thioketene structure adds more possibilities for cross-linking.

The above reaction is only given by way of explanation of what really occurs when the photosensitive composition of the invention is exposed to actinic light rays. The invention, however, is independent of the real reaction that occurs and of whatever the mechanism of cross-linking may be.

In a very interesting and particularly preferable embodiment of the process of the invention, the polymeric material carrying groups that are reactive with intermediates deriving from the photochemical decomposition of thiadiazole groups, also carries thiadiazole groups distributed along the polymeric chain.

These polymeric materials carrying thiadiazole substituents are obtained by homopolymerisation or copolymerisation of one or more unsaturated monomers comprising thiadiazole groups. In the case of copolymerisation products one or more comonomers may be chosen from the list of possible comonomers indicated above, as well as from the plurally unsaturated monomeric materials.

The polymeric materials carrying thiadiazole substituents may also be obtained by polycondensation reactions wherein one of the starting materials carries at least one thiadiazole substituent, for instance the polyester obtained by polycondensation of 2,2-bis(4-hydroxyphenyl)- propane, isophthalic acid, and 6-(3,5-dicarboxy-phenoxy-sulphonyl)-naphtho-[2,1-d]-1,2,3-thiadiazole.

Already existing polymeric materials may be made to react with compounds containing thiadiazole groups. These polymeric materials may be natural polymers, chemically modified natural polymers, synthetic polymerisation products, or polyaddition products as long as they possess in their structure a substantial amount of reactive groups. The natural polymers, the chemically modified natural polymers, and the synthetic polymerisation or polycondensation products belong to the same classes already indicated above. Of special interest are poly(vinylbutyral), that still contains a substantial amount of free hydroxyl groups, hydroxymethyl- and hydroxyethyl-substituted polyamides and the polyether obtained by polycondensation of 2,2-bis(4-hydroxyphenyl)-propane and epichlorohydrin.

All these natural and synthetic polymeric materials are reactive with thiadiazole derivatives such as chlorocarbonyl- or chlorosulphonyl-substituted compounds containing thiadiazole groups, for they all possess free hydroxyl groups in their polymeric structure.

As compounds containing thiadiazole groups that can be made to react with natural and synthetic polymeric materials may be mentioned for instance 4-chlorocarbonyl-1,2,3-thiadiazole, 4-chlorocarbonyl-5-methyl-1,2,3-thiadiazole, 6-chlorocarbonyl-1,2,3-benzothiadiazole, 6-chlorosulphonyl - naphtho-[2,1-d]-1,2,3-thiadiazole, and the like.

Satisfactory results are obtained with polymeric compositions comprising about 20% by weight of compounds containing thiadiazole groups based on the total weight of polymeric material carrying reactive groups and of compounds containing thiadiazole groups. If the polymeric composition is a natural or synthetic polymeric material carrying both reactive groups and thiadiazole groups a very high cross-linking tendency is obtained when the amount of the repeating units comprising thiadiazole groups is about 50 moles percent of the total amount of units in the natural or synthetic polymeric material. The highest cross-linking tendency, however, is attained when at the same time the reactive groups constitutes the other 50 mole percent of the polymeric composition.

By polymeric composition carrying thiadiazole groups, there is meant in the following description one and the same polymer carrying both reactive groups and thiadiazole groups, as well as a mixture of a polymer carrying the reactive groups and of a compound comprising more than one thiadiazole group. Moreover the photosensitive composition may comprise other polymers, activating agents, plasticisers, extenders and the like.

Cross-linking of the soluble polymeric composition can be effected to some extent by simply subjecting it to actinic light rays. However, in order to obtain the optimum degree of cross-linking as well as a faster reaction, the reaction is preferably carried out in the presence of catalytic amounts of activating dyes. Among these may be mentioned Michler's ketone, and analogues, 4H-quinolizin-4-one, certain naphthothiazolines and pyrazolines, and the like.

The polymeric composition may be exposed to actinic light from any source and of any type. The light source should preferably, though not necessarily, furnish an effective amount of ultra-violet radiation. Suitable sources of light include carbon arcs, mercury vapour lamps, fluorescent lamps, argon glow lamps, photographic flood lamps and tungsten lamps.

For initiating the photochemical cross-linking by means of the thiadiazole groups there is not required a very strong light source. Indeed, in most of the examples described hereinafter, an 80 watt mercury vapour lamp is used. Brighter light sources are generally not needed since at these relatively low light intensities the photochemically cross-linking influence of the thiadiazole groups is found to be strong enough.

In the photochemical cross-linking of polymeric compositions comprising thiadiazole groups high temperatures are not required. The exposure, however, to strong light sources at a relatively short distance brings about a certain heating of the mass to be cross-linked, which heating exercises a favourable influence upon the cross-linking rate.

It has been found that the polymeric composition comprising thiadiazole groups according to the invention is photosensitive, in the sense that it is cross-linked to the insoluble state on exposure to light. Thus, if a layer of such a photosensitive polymeric composition, initially soluble, is applied to a support and exposed photographically, the exposed areas become insoluble.

The invention is valuable in forming plates and films wholly made of the photosensitive polymeric composition. The present process also makes possible the formation of coated printing films on any base by the deposition according to any known process of films or coatings of the photosenstive polymeric composition. Typical bases are metal sheets (e.g. copper, aluminium, zinc, magnesium, etc.), glass, cellulose ester film, poly(vinyl acetal) film, polystyrene film, polycarbonate film, poly(ethylene terephthalate) film, paper, etc. For screen-printing, nets of metal, e.g. of bronze and steel, as well as of polyamides such as nylon fabrics, are well suited.

The base or support is coated with a solution of the photosensitive polymeric composition in a suitable solvent, whereupon the solvent or solvent mixture is eliminated by known means such as evaporation, thus leaving a more or less thin coating of the photosensitive polymeric composition upon the base or support. Thereafter the dried photosensitive coating is exposed to actinic light rays.

When the support material carrying the photosensitive polymeric composition reflects light, there may be present, e.g. superposed on said support and adherent thereto or in the surface thereof, a layer or stratum absorptive of actinic light so as to minimize reflection of incident actinic light on the combined support.

If the photosensitive polymeric composition is soluble in water, this may be used as a solvent for coating the support. On the contrary, if photosensitive polymeric compositions insoluble in water are used, organic solvents, mixtures of organic solvents, or mixtures of organic solvents and water may be used.

The plates formed wholly of or coated with the photosensitive polymeric composition are useful in photography, photomechanical reproduction, lithography and intaglio printing. More specific examples of such uses are offset printing, silk-screen printing, duplicating pads, manifold stencil sheeting coatings, lithographic plates, relief plates, and gravure plates. The term "printing plates" as used in the claims is inclusive of all of these.

A specific application of the invention is illustrated by a typical preparation of a printing plate. In this application, a plate usually consisting of metal, is coated with a film of the photosensitive composition. When the plate is not of metal it may consist wholly of the photosensitive composition or it may be coated with a layer thereof. In all these cases the surface of the plate is then exposed to light through a contacting process transparency, e.g. a process positive or negative (consisting solely of opaque and transparent areas and where the opaque areas are of the same optical density, the so-called line or half-tone negative or positive). The light induces the reaction that causes the crosslinking of the surface areas beneath the transparent portions of the image, whereas the areas beneath the opaque portions of the image remain soluble. The soluble areas of the surface are then removed by a developer, and the remaining cross-linked relief portions of the film can serves as a resist image, whereas the exposed base material is etched, thus forming a relief plate, or the plate can be inked and used as a relief printing plate directly in the customary manner.

After washing away the non-exposed and thus soluble parts of the layer or film, the polymer parts cross-linked by exposure to actinic light may be subjected, if desired, to other known hardening techniques. Of course, these hardening techniques will depend upon the kind of the light-sensitive polymer used. When e.g. the original polymer is an epoxy resin of 2,2-bis(4-hydroxyphenyl)propane and epichlorohydrin, which contains thiadiazole groups or which is mixed with a compound containing more than one thiadiazole group, the cross-linked polymer part remaining after exposure and development can still be hardened supplementarily according to known techniques for epoxy resins.

The purpose of this additional hardening is to strengthen the cross-linked polymer parts as much as possible. If e.g. the remaining cross-linked polymer surface is to be used as a printing plate a similar subsequent hardening is often desirable.

The thickness of the photosensitive layer is a direct function of the thickness required in the relief image and this will depend on the subject to be reproduced and particularly on the extent of non-printing areas. In the case of half-tones the screen used is also a factor. In general, the thickness of the photosensitive layer will vary from about 0.001 mm. to about 7 mm. Layers ranging from about 0.001 to about 0.70 mm. in thickness will be used for half-tone plates. Layers ranging from about 0.25 to about 1.50 mm. in thickness will be used for the majority of letterpress printing plates, including those wherein half-tone and line images are to be combined.

The solvent liquid used for washing or "developing" the printing plates made from the photosensitive composition must be selected with care, since it should have good solvent action on the unexposed areas, yet have little action on the hardened image or upon the base material, the anti-halation layer, or the subbing layer with which the photosensitive composition may be anchored to the support.

When the photosensitive polymeric composition is to be applied to a metal support, the polymeric material can be selected from polyvinylbutyrals and polyepoxy resins, the great adhesivity of which to metals is known.

The solubility of the starting material as well as the solvent that will be used to "develop" the photographic image, can be adapted to the final goal of the photochemically cross-linked polymeric material. The fact that the present photosensitive compositions can be prepared long before use constitutes another advantage.

In addition to the printing uses described above the photosensitive polymeric compositions are suitable for other purposes, e.g. as ornamental plaques or for producing ornamental effects, as patterns for automatic engraving machines, foundry molds, cutting and stamping dies, name stamps, relief maps for braille, as rapid cure coatings, e.g. on film base, as sound tracks on film, for embossing plates, paper, e.g. with a die prepared from the photohardenable compositions, in the preparation of printed circuits, and in the preparation of other plastic articles.

The following examples illustrate the present invention.

EXAMPLE 1

According to the method described in Berichte, vol. 47. 2186 (1914), diethyl carbonate is converted with hydrazine hydrate into carbazic acid ethyl ester. This carbazic acid ethyl ester is converted with pyruvic acid into ethoxycarbonyl hydrazono-pyruvic acid, which by reaction with thionyl chloride forms 4-carboxy-1,2,3-thiadiazole in accordance with J. Am. Chem. Soc., 77, 5362 (1955).

10 g. of 4-carboxy-1,2,3-thiadiazole are added to 30 ccs. of thionyl chloride and 1 cc. of dimethylformamide. The mixture is allowed to react for 4 h. at 80–90° C. and kept overnight. The reaction mixture is then concentrated by evaporation in vacuo till a dry product is obtained, which is treated with refluxing hexane. On cooling, crystalline 4-chlorocarbonyl-1,2,3-thiadiazole having a melting point of 50° C. deposits.

1.41 g. of polyether obtained by polycondensation of 2,2-bis(4-hydroxyphenyl)-propane and epichlorhydrin is dissolved in 20 ccs. of pyridine together with 0.74 g. of the 4-chlorocarbonyl-1,2,3-thiadiazole described above. The mixture is allowed to react for 3 h. at 70 to 80° C. After dilution of the mixture with methylene chloride the polymer is precipitated and washed repeatedly with ethanol, and finally dried in vacuo. The resulting polyether contains approximatively 5 mole percent of recurring units of the formula:

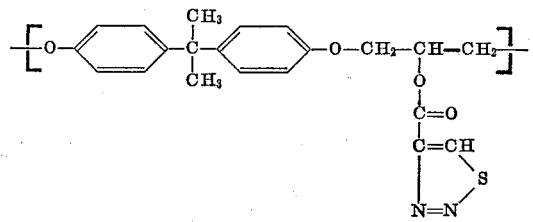

25 mg. of the modified polyether are dissolved in a mixture of 2 ccs. of sym.tetrachloroethane and 1 cc. of methylene chloride. To this solution 2.5 mg. of Michler's ketone are added.

The solution formed is coated on an aluminium foil in such a way that after evaporation of the solvent a layer of approximatively 1μ in thickness remains. This layer is exposed through a line negative by means of an 80 watt mercury vapour lamp placed at a distance of 15 cm. The layer is then developed with a mixture of equal parts of sym.tetrachloroethane and methylene chloride, whereby the unexposed parts are washed away. For obtaining a good resist image an exposure time of 22 seconds is required. When illuminating with an ordinary 300 watt lamp an exposure time of 2 min. 45 sec. is needed.

EXAMPLE 2

The ethyl ester of 3-hydroxy-2-nitroso-crotonic acid is formed and converted into 4-ethoxycarbonyl-5-methyl-1,2,3-oxadiazole according to the method described in Annalen der Chemie, 325, 134 (1902), which is then converted into 4-ethoxy-carbonyl-5-methyl-1,2,3-thiadiazole according to Annalen der Chemie, 333, 6 (1904).

10 g. of this product was added to 25 ccs. of thionyl chloride and 0.5 cc. of dimethylformamide. The mixture is refluxed for 4 h. at 80° C. Some 60 h. later the remaining thionyl chloride is distilled in vacuo and 4-chlorocarbonyl-5-methyl-1,2,3-thiadiazole remains as an oily liquid. An amount of 1 cc. of this carboxylic acid chloride, freshly distilled in vacuo is added to a solution in 20 ccs. of pyridine of 1.41 g. of the polyether obtained by polycondensation of 2,2-bis(4-hydroxyphenyl)-propane and epichlorohydrin.

After having reacted for 2 h. at 50 to 60° C. the reaction mixture is diluted with methylene chloride. The polymer is precipitated with methanol and is washed repeatedly with ethanol, and dried in vacuo.

The polymer contains 35 mole percent of recurring units having the formula:

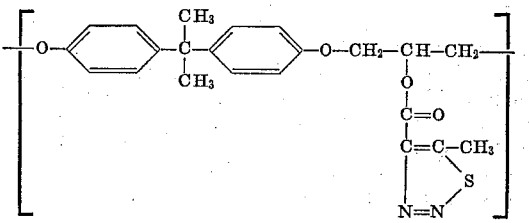

By modification in the above described reaction of the amount of carboxylic acid chloride, polyethers are obtained in which a corresponding number of recurring units are substituted with a thiadiazole group.

As in Example 1 amounts of 25 mg. of the modified polyether are dissolved each time in mixtures of 2 ccs. of sym-tetrachloroethane and 1 cc. of methylene chloride. Amounts of 2.5 mg. of a sensitising agent may either be added thereto or not. A layer is applied to an aluminium foil, dried, exposed to a line negative, and developed as in Example 1. The resutls are listed in the following table.

| Test | Mole percent of thiadiazole in polyether | Sensitising agent | Required exposure time | |
|---|---|---|---|---|
| | | | With U.V. light | With ordinary light |
| 1 | 35 | | 15' | |
| 2 | 37.5 | Michler's ketone | 1' | |
| 3 | 37.5 | p-Dimethylaminobenzophenone. | 5'30" | |
| 4 | 37.5 | p-(4,5-dihydro-1,3-diphenyl-5-pyrazolyl)-phenol. | 5'30" | |
| 5 | 37.5 | 3,7-dimethylaminothioxanthene-5,5-dioxide. | 5'30" | |
| 6 | 37.5 | 1,3-diphenyl-5-(p-iodophenyl)-2-pyrazoline. | 3' | |
| 7 | 37.5 | 4,4-bis(dimethylamino)-benzohydrol. | 1'30" | |
| 8 | 65 | Michler's ketone | 1'30" | 7'30" |
| 9 | 65 | p-Dimethylaminobenzaldehyde. | 1' | 7'30" |
| 10 | 65 | p-Dimethylaminoacetophenone. | 1' | 15' |
| 11 | 65 | 1,1-bis(p-dimethylaminophenyl)-ethylene. | 7'30" | |

EXAMPLE 3

6-carboxyl-1,2,3-benzothiazole is formed according to the method described in Annalen der Chemie, 277, 209–261 (1893) and particularly according to the pages 239, 249, 251, 253, and 255.

To 20 ccs. of thionyl chloride and 1 cc. of dimethylformamide, 1 g. of this product is added. The mixture is refluxed for 90 minutes. The excess thionyl chloride is evaporated and the reaction product is purified by recrystallisation from a mixture of equal parts of hexane and benzene. The purified 6-chlorocarbonyl-1,2,3-benzothiadiazole is dried in vacuo.

Then a solution is made of 0.750 g. of the polyether from 2,2-bis(4-hydroxyphenyl)-propane and epichlorohydrine in 15 ccs. of pyridine, and 1.2 g. of 6-chlorocarbonyl-1,2,3-benzothiadiazole is added thereto. The reaction is continued for 72 h. at room temperature. The mixture is then diluted with methylene chloride. The polymer is precipitated with ethanol, repeatedly washed with ethanol, and finally dried in vacuo. The resulting polymer comprises 12.5 mole percent of recurring units having the formula:

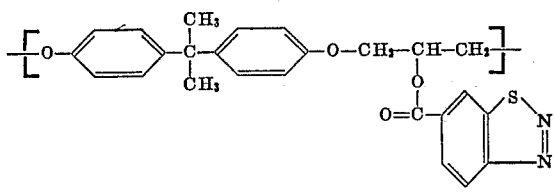

As in Example 1 25 mg. of this modified polymer are dissolved and coated on an aluminium foil to a layer of 1μ in thickness. The material is then exposed through a process transparency with the light of an 80 watt mercury vapour lamp and developed as in Example 1. The exposure time required to yield a good relief image is 11 minutes. When adding to the solution 2.5 mg. of Michler's ketone, the exposure time is reduced to 2 minutes. If the layer containing 10% by weight of Michler's ketone is exposed to a carbon arc lamp (5 a./50 v.) at a distance of 30 cm. the exposure time needed is 2'30".

EXAMPLE 4

The di-sodium salt of 1,5-disulpho-2-naphthylamine is converted according to Friedländer (Fortschritte der Teerfarbenfabrikation und verwandter Industriezweige, 15, p. 327) after diazotisation by reduction with sodium sulphide into the sodium salt of 6-sulphonaphtho-[2,1-d]-1,2,3-thiadiazole. An amount of 4.5 g. of the latter product is added to 30 ccs. of distilled chlorosulphonic acid. The mixture is heated for 2½ h. at 100° C. on an oil bath. It is then cooled and poured in ice-water. The precipitate is filtered by suction and washed with water. The product is then dissolved in methylene chloride whereupon the resulting solution is dried on calcium chloride, and evaporated after filtration. The resulting sulphochloride has a melting point of 198° C.

A solution is made of 1 g. of the polyether of 2,2-bis(4-hydroyphenyl)-propane and epichlorohydrine in 10 ccs. of methylene chloride and 1 cc. of pyridine. To this solution an amount of 1 g. of 6-chlorosulphonynaphtho-[2,1-d]-1,2,3-thiadiazole is added. After reaction for 48 h. at room temperature the solution is diluted with methylene chloride and the polymer is precipitated with methanol, washed repeatedly with methanol, and dried in vacuo. The polymer comprises 28 mole percent of recurring units having the formula:

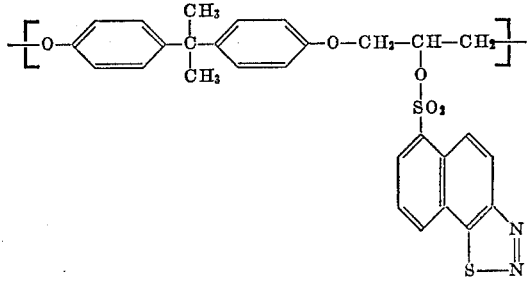

The modified polymer is dissolved as in Example 1 but without addition of a sensitising agent. The solution obtained is coated to a layer, exposed for 2 minutes through a line negative by means of a 80 watt mercury vapour lamp, and developed. The 2 minutes exposure suffices to give a good relief image. An exposure time of ½ minute suffices if an amount of 10% by weight of Michler's ketone has been added. An exposure time of 5½ minutes is needed when Michler's ketone has been added and when a common 300 watt lamp is used.

EXAMPLE 5

In a 250 ccs. flask fitted with stirrer and dropping funnel is brought a solution in 60 ccs. of dioxane of 1.42 g. of 2,2-bis(4-hydroxyphenyl)-propane (0.005 mole) and 2.85 g. of 6-chlorosulphonylnaphtho-[2,1-d]-1,2,3-thiadiazole (0.01 mole), the later product being prepared according to Example 4. The reaction mixture is stirred while slowly adding dropwise at room temperature 12 ccs. of a 5% aqueous sodium carbonate solution. The addition is stopped when the mixture is turning alkaline. The product is precipitated by adding water, washed with water, filtered by suction, and dried in vacuo. The resulting 2,2-bis{p[(6-naphtho-[2,1-d]-1,2,3-thiadiazolyl) - sulphonyloxy]-phenyl}-propane has a melting point of approximatively 210° C., and has the following formula:

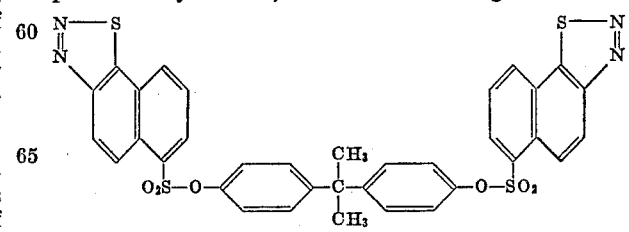

Then a solution is made of 50 mg. of the polyether of 2,2-bis(4-hydroxyphenyl)-propane and epichlorohydrine, 2 mg. of Michler's ketone, and 10 mg. of the thiadiazole compound as prepared above, in 2 ccs. of methylene chloride and 1 cc. of sym.tetrachloroethane. This solution is coated on an aluminium foil as in Example 1. The layer is dried and subsequently exposed to a line negative or positive at a distance of 15 cm. with the aid of an 80 watt mercury vapour lamp, and finally developed. In order to obtain a good relief image an exposure time of 15 minutes is required.

EXAMPLE 6

In a 250 ccs. flask fitted with a stirrer and a dropping funnel is brought a solution of 1.82 g. of 5-hydroxyliso-phthalic acid (0.01 mole) and 1.2 g. of sodium hydroxide (0.03 mole) in 50 ccs. of water.

While stirring a solution of 2.85 g. of 6-chlorosulphonyl-naphtho[2,1-d]-1,2,3-thiadiazole (see Example 4) (0.01 mole) in 30 ccs. of acetone is added dropwise. The mixture is stirred for another 30 minutes. Subsequently the mixture is filtered, acidified with hydrochloric acid, and poured in water. The resulting precipitate of 6-(3,5-dicarboxy-phenoxy-sulphonyl)-naphtho-[2,1-d]- 1,2,3-thiadiazole is filtered by suction and dried at 100° C.

An amount of 2 g. of this product is added to 20 ccs. of thionyl chloride and 0.5 cc. of dimethylformamide. The mixture is refluxed until complete dissolution, and then refluxed for another hour. Thereupon the reaction mixture is concentrated by evaporation. The residue is recrystallised from benzene or hexane, filtered, and dried in vacuo. The resulting 6-(3,5-dichlorocarbonyl - phenoxy - sulphonyl)-naphtho-[2,1-d]-1,2,3-thiadiazole has a melting point of 160° C.

In a 150 ccs. flask fitted with a stirrer and a dropping funnel are stirred 0.912 g. of 2,2-bis(4-hydroxyphenyl)-propane (0.004 mole) and 8 ccs. of 1 N sodium hydroxide for dissolving. Subsequently 2 ccs. of methylene chloride are added.

While stirring, a solution in 8 ccs. of methylene chloride of 0.406 g. of isophthaloyl chloride (0.002 mole) and 0.934 g. of 6-(3,5-dichlorocarbonyl-phenoxy-sulphonyl)-naphtho-[2,1-d]-1,2,3-thiadiazole, prepared as described above, is added dropwise. Then stirring is continued for another 30 minutes.

The layer comprising the polymer is poured into ethanol, whereupon the precipitated polymer is filtered by suction, and dried in vacuo. The polymer comprises 37.5 mole percent of recurring units having the formula:

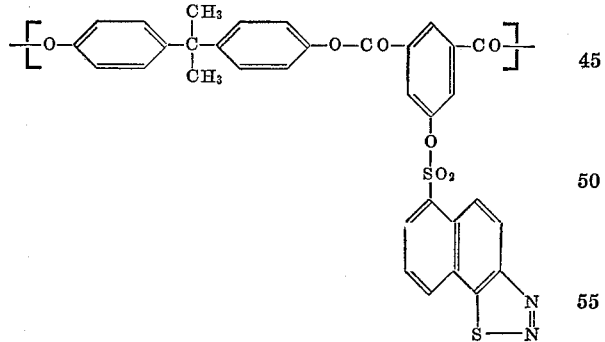

whereas the remainder is composed of recurring units having the formula:

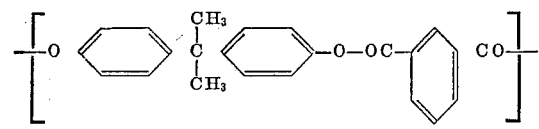

A solution of 25 mg. of this modified polyester and 2.5 mg. of Michler's ketone are coated on an aluminium foil, exposed through a line negative with the aid of an 80 watt mercury vapour lamp, and developed as in Example 1. An exposure time of 5½ minutes is required for obtaining a good relief image.

EXAMPLE 7

Example 1 is repeated but with varying ratios of polyether and 4-chlorocarbonyl-1,2,3-thiadiazole so that modified polyethers are obtained with varying substitution degree of 1,2,3,-thiadiazole groups. Each of these modified polyethers is dissolved, coated to a layer, exposed with the aid of an 80 watt mercury vapour lamp, and developed as in Example 1. The results are listed in the following table.

| Test | Mole percent of 1,2,3-thiadiazole groups | Required exposure time |
|---|---|---|
| 1 | ±10 | ±8′30″ |
| 2 | 15.5 | 3′30″ |
| 3 | ±20 | ±3′15″ |
| 4 | 25 | 2′ |
| 5 | 96 | 23″ |

EXAMPLE 8

In a flask are placed 34 g. of phenylchloroformate, 34 g. of sodium thiocyanate, and 100 ccs. of distilled benzene. The mixture is allowed to react in the dark at room temperature. Subsequently it is filtered, concentrated by evaporation and the residue is distilled in vacuo. Yield: 23 g. of phenylisothiocyanatoformate.

To 10 g. of the latter compound are added 3 g. of diazomethane dissolved in 160 ccs. of ether. The mixture is kept for 24 hours in the dark at room temperature. The precipitate formed is filtered by suction and dried. Yield: 3 g. of 5-(phenoxy-carbonamido)-1,2,3-thiadiazole. These 3 g. are added to 120 ccs. of ethanol and 50 ccs. of acetone, refluxed for 3 hours in the presence of 3 g. of magnesium oxide, suction-filtered, and concentrated by evaporation. Yield: 2 g. of 5-amino-1,2,3-thiadiazole, which is recrystallised from acetone. Melting point: approximatively 180° C.

In a 100 ccs. flask fitted with a stirrer and a dropping funnel are placed 1 g. of polystyrene sulphochloride and 10 ccs. of acetone. A solution of 0.5 g. of 5-amino-1,2,3-thiadiazole in 5 ccs. of acetone and 5 ccs. of dioxane is added dropwise. Subsequently a solution of 0.25 g. of sodium carbonate in 3 ccs. of water is added dropwise and the resulting mixture is stirred for 30 minutes. After concentration by evaporation, the precipitate is filtered with suction and washed with water. The modified polymer contains 65 mole percent of units having the following structure:

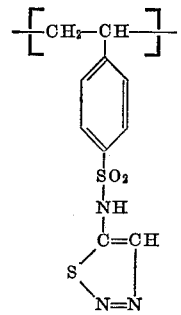

An amount of 25 mg. of the modified polymer together with 2.5 mg. of Michler's ketone is dissolved in 3 ccs. of ethylene glycol monomethylether and applied to an aluminium foil to obtain a layer of approximately 1μ in thickness when dry.

The latter layer is exposed through a negative line transparency from a distance of 15 cm. by means of an 80 watt mercury vapour lamp. The unexposed areas are then washed away in a mixture of ethyleneglycol monomethylether and cyclohexanone. A relief image is obtained. An exposure for 2 minutes suffices for producing a relief image of good quality.

I claim:

1. A curable composition, which is capable of forming a cross-linked structure on exposure to actinic light, comprising a polymer containing groups that are relative with intermediates deriving from the photochemical decomposition of 1,2,3-thiadiazole groups, and 1,2,3-thiadiazole groups present either in said polymer, or in separate compounds containing at least two of the said 1,2,3-thiadiazole groups.

2. A curable composition according to claim 1, wherein the polymeric material is a polyether of 2,2-bis(4-hydroxyphenyl)-propane and epichlorohydrin.

3. A curable composition according to claim 1, wherein the compound containing more than one thiadiazole group is 2,2-bis{p[(6-naphtho-[2,1-d]-1,2,3-thiadiazolyl)-sulphonyl-oxy]-phenyl}-propane.

4. A curable composition according to claim 1, wherein the polymeric material is a polyether of 2,2-bis(4-hydroxyphenyl)-propane and epichlorohydrin, which has been reacted with a compound taken from the group consisting of 4-chlorocarbonyl-1,2,3-thiadiazole, 4-chlorocarbonyl-5-methyl-1,2,3-thiadiazole, 6-chlorocarbonyl-1,2,3-benzothiadiazole, and 6-chlorosulphonyl-naphtho[2,1-d]-1,2,3-thiadiazole.

5. A curable composition according to claim 1, wherein the polymeric material is a polyester obtained by polycondensation of 2,2-bis(4-hydroxyphenyl)-propane, isophthaloyl chloride and 6-(3,5-dichlorocarbonyl-phenoxysulphonyl)-naphtho-[2,1-d]-1,2,3-thiadiazole.

6. A curable composition according to claim 1, wherein the polymeric material is obtained by making polystyrene sulphochloride react with 5-amino-1,2,3-thiadiazole.

7. A curable composition according claim 1, wherein an activating compound is added to the photo-sensitive composition.

8. Process for producing photographic resist images or photographic printing plates by the photochemical cross-linking of a polymeric material, comprising exposing a photographic element to actinic light through a process transparency, said photographic element comprising a support having thereon a photosensitive layer comprising a polymer containing groups that are reactive with intermediates deriving from the photochemical decomposition of 1,2,3-thiadiazole groups, and 1,2,3-thiadiazole groups present in said polymer or in separate compounds containing at least two of said 1,2,3-thiadiazole groups, whereby in the exposed areas said polymeric material is cross-linked to the insoluble state and removing the soluble polymeric material in the unexposed areas, thereby forming a photographic resist image or a photographic printing plate.

References Cited

UNITED STATES PATENTS

| 2,732,301 | 1/1956 | Robertson et al. | 96—115 |
| 3,193,536 | 7/1965 | Wagner et al. | 96—115 X |

FOREIGN PATENTS

| 1,123,458 | 6/1956 | France. |
| 254,208 | 9/1964 | Australia. |
| 999,796 | 7/1965 | Great Britain. |

NORMAN G. TORCHIN, Primary Examiner

R. E. MARTIN, Assistant Examiner

U.S. Cl. X.R.

96—88, 115